US009266600B2

(12) United States Patent
Milliere et al.

(10) Patent No.: US 9,266,600 B2
(45) Date of Patent: Feb. 23, 2016

(54) PRIMARY FUSELAGE STRUCTURE FOR AIRCRAFT INCLUDING STRUTS CAPABLE OF EARLY FAILURE TO INCREASE THE ABSORPTION OF ENERGY IN THE EVENT OF A CRASH

(71) Applicant: Airbus Operations (SAS), Toulouse (FR)

(72) Inventors: Jerome Milliere, Leguevin (FR);
Jean-Marc Faure, L'Isle Jourdain (FR);
Edmond Froger, Colomiers (FR);
Christian Rekert, Toulose (FR);
Sandrine Monlouis-Bonnaire, La Salvetat-Saint-Gilles (FR)

(73) Assignee: Airbus Operations (SAS), Toulouse (FR)

( * ) Notice: Subject to any disclaimer, the term of this patent is extended or adjusted under 35 U.S.C. 154(b) by 427 days.

(21) Appl. No.: 13/926,523

(22) Filed: Jun. 25, 2013

(65) Prior Publication Data

US 2014/0001312 A1    Jan. 2, 2014

(30) Foreign Application Priority Data

Jun. 28, 2012 (FR) .................................... 12 56180

(51) Int. Cl.
    *B64C 1/06* (2006.01)
(52) U.S. Cl.
    CPC ...................... *B64C 1/062* (2013.01)
(58) Field of Classification Search
    CPC .................................. B64C 1/062; B64C 1/18
    See application file for complete search history.

(56) References Cited

U.S. PATENT DOCUMENTS

| 2010/0096501 | A1  | 4/2010 | Meyer |
| 2011/0042513 | A1* | 2/2011 | Milliere .................. B64C 1/062 |
| | | | 244/121 |
| 2012/0132745 | A1* | 5/2012 | Fitzsimmons ............ B64C 1/06 |
| | | | 244/118.5 |

FOREIGN PATENT DOCUMENTS

| DE | 102009020891 | 11/2010 |
| DE | 102010014638 | 10/2011 |
| FR | 2936218      | 3/2010  |

OTHER PUBLICATIONS

French Search Report, Feb. 20, 2013.

* cited by examiner

*Primary Examiner* — Nicholas McFall
(74) *Attorney, Agent, or Firm* — Greer, Burns & Crain Ltd.

(57) ABSTRACT

A primary fuselage structure for an aircraft, including circumferential frames, a floor structure having lateral ends connected to the circumferential frames, at least one strut supporting the floor structure and including a lower end fixed on a circumferential frame and an upper end fixed on the floor structure, and at least one failure-initiating element associated with the strut, including a first arrangement for fastening the strut to a circumferential frame, at a distance from the lower end of the strut, as well as a second arrangement for attaching the circumferential frame to the strut, away from the ends of the strut. A fuselage segment and aircraft, such as an airplane, including the primary fuselage structure are also provided.

16 Claims, 7 Drawing Sheets

PRIMARY FUSELAGE STRUCTURE FOR AIRCRAFT INCLUDING STRUTS CAPABLE OF EARLY FAILURE TO INCREASE THE ABSORPTION OF ENERGY IN THE EVENT OF A CRASH

CROSS-REFERENCES TO RELATED APPLICATIONS

This application claims the benefit of the French patent application No. 12 56180 filed on Jun. 28, 2012, the entire disclosures of which are incorporated herein by way of reference.

FIELD OF THE INVENTION

The present invention relates generally to dissipation of impact energy resulting from a crash of an aircraft by a lower part of the primary structure of the aircraft fuselage, in order to give the best possible protection to the passengers of the aircraft.

It thus relates to a primary aircraft fuselage structure capable of dissipating the energy resulting from such a crash, particularly when the impact relates to a lower region of the fuselage.

The invention can be advantageously applied to primary fuselage structures which are made at least in part of composite materials.

It is designed particularly to be applied to fuselages of airplanes, particularly medium- and high-capacity airliners.

BACKGROUND OF THE INVENTION

The primary fuselage structure of airliners is mainly composed of skins reinforced by circumferential frames and longitudinal stiffeners.

This primary structure comprises a lower floor structure connected at its lateral ends to the circumferential frames and supported by a lattice of struts, sometimes called rods. The aforementioned lower floor is generally called the cargo floor.

The primary structure also comprises a passenger cabin floor structure connected by its lateral ends to the circumferential frames and also supported by struts. The passenger cabin floor is called the main floor in the following.

Figure 1:
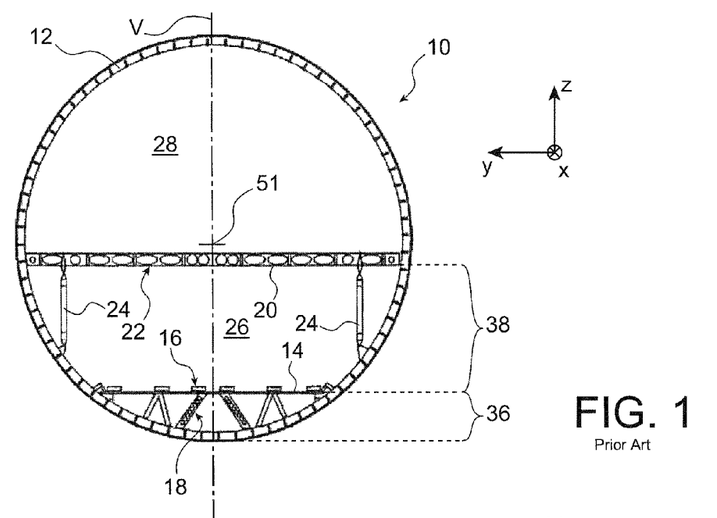
FIGS. 1 and 2, already described, are schematic cross-section views of primary airplane fuselage structures of known types.

FIG. 1 illustrates a typical example of such a primary fuselage structure 10 seen in cross-section, and shows in particular a circumferential frame 12, a beam 14 of the lower floor structure 16, a lattice of struts 18 each having a lower end fixed to the circumferential frame 12 and an upper end fixed to the beam 14 of the lower floor structure 16 so as to support it, as well as a beam 20 of the main floor structure 22, and two struts 24 each having a lower end fixed to the circumferential frame 12 and an upper end fixed to the beam 20 of the main floor structure 22 so as to support it. The lower floor structure 16 makes it possible to support the floor of the baggage hold 26 of the airplane, while the main floor structure 22 makes it possible to support the floor of the passenger cabin 28.

Figure 2:
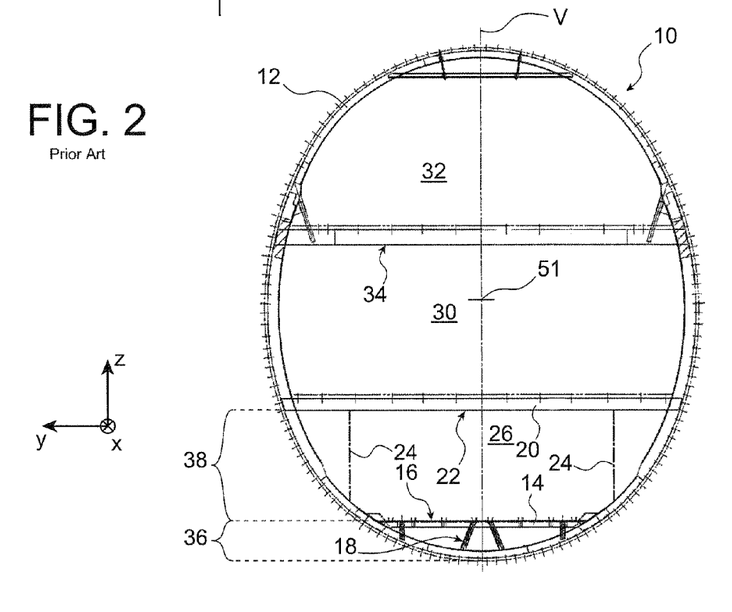

FIG. 2 illustrates a second typical example of a primary fuselage structure 10, viewed in cross-section, which differs from the primary structure of FIG. 1 in that the passenger cabin comprises a lower deck 30 and an upper deck 32, such that the primary structure also comprises an upper floor structure 34 designed to support the floor of the upper deck.

In certain cases of an airplane crash occurring under low speed conditions, particularly as regards the vertical component of that speed, it is desirable that the impact energy associated with that vertical component be optimally dissipated by a lower portion of the primary structure, defined below the main floor structure 22, such that the repercussions of the vertical impact suffered by the passengers in the cabin area remain below regulatory limits.

To this end, it is desirable, during a first phase immediately following a vertical impact, that a first portion 36 of the primary structure, defined under the lower floor or cargo floor, crushes while transmitting a low level of force to a second portion 38 of this primary structure, defined above the lower floor. This first phase, which typically lasts on the order of 150 milliseconds, has the aim of allowing maximum energy absorption by the first portion 36 of the primary structure. This first phase is normally followed by a second phase during which the second portion 38 of the structure deforms while absorbing the surplus energy that the first portion was unable to absorb.

It is therefore desirable to limit the level of the forces transmitted to the second portion 38 of the primary structure by its first portion 36 during a crash, with the purpose of ensuring that the second portion 38 does not begin deforming prematurely, which would limit the crushing of the first portion 36 and hence the quantity of energy absorbed by the entire lower portion of the primary structure. Limiting the force level transmitted to the second portion 38 of the primary structure during the aforementioned first phase is also desirable for reducing the capacity for resisting these forces required of said second portion 38, and thus limiting the mass of the elements constituting this second portion such as the struts 24 supporting the main floor structure and the circumferential frames 12.

However, a large portion of the forces applied to the first portion 36 of the primary structure during a crash are transmitted to the lower floor structure 16 by the struts 18 supporting it. These forces pass through the lateral ends of the lower floor structure and thus reach directly regions of the circumferential frames 12 which are situated at the base of the second portion 38 of the primary structure, causing premature deformation of this second portion.

Reducing the stiffness of the struts 18 supporting the lower floor structure 16 would allow a reduction in the level of the forces transmitted to the second portion 38 of the primary structure in the event of a crash, but this solution is not satisfactory because it necessarily results in a reduction of the permissible load on the lower floor during normal operation of the airplane.

Another solution which was proposed by the applicant is described in international patent application WO 2009/101372 A1. In this document, a floor structure is supported by struts in the form of compression beams made of composite material, oriented in the vertical direction and each fixed to a circumferential frame. These struts each support at their upper end a gusset able to cut the strut under the influence of a high-level compressive force such as that resulting from a crash.

However, this solution requires that each strut be capable of resisting the cutting means of the corresponding gusset when the strut is subjected to a compression force induced by the loading on the floor, in normal operation, so that the cutting of the strut occurs only in the event of a crash.

Thus this solution necessitates overdimensioning of the struts, which leads to an undesirable increase in the overall mass of the primary structure of the fuselage.

In addition, as explained above, the impact energy resulting from a crash can be largely absorbed by the lower portion of the primary structure of the fuselage of the airplanes.

In fuselages having a metal primary structure, made of aluminum for example, absorption of impact energy results from a plastic deformation of the metal elements constituting the primary structure. The metal elements that deform are in particular the skin, the longitudinal stiffeners, the struts 18 supporting the lower floor structure 16, the struts 24 supporting the main floor structure 22, and a lower portion of each circumferential frame 12 defined below the main floor structure.

However, the use of composite materials in airplane construction is becoming general due to the fact that these materials allow great stiffness to be obtained with low mass, offering the airplane using these composite materials a performance surplus compared with an airplane made of metallic materials.

It has thus been proposed to use such composite materials to construct the main elements of fuselage primary structures, particularly the circumferential frames, the skins and the longitudinal stiffeners.

However, use of these composite materials does not allow these structural elements to deform plastically as elements made of metal do. On the contrary, when they are subjected to a large impact, these elements generally undergo explosive failure, resulting in a relatively low level of absorbed energy.

The use of primary fuselage structures of known type, the main elements whereof are made of composite materials, thus considerably reduces the quantity of energy that can be absorbed by the structure in a crash, particularly in the case of an impact located at the belly of the fuselage, vertically below the central longitudinal axis of that fuselage, which corresponds to the scenario generally used by certification authorities.

SUMMARY OF THE INVENTION

In particular, the invention has as its object to contribute a simple, economical and effective solution to all or part of these problems, allowing the aforementioned disadvantages to be at least partly avoided.

It thus has as its object a primary fuselage structure for aircraft having an optimal capacity for absorbing the energy resulting from a vertical crash type impact.

It also has as its object a primary fuselage structure for aircraft having a low mass.

To this end, the invention proposes a primary fuselage structure for aircraft, including:

a plurality of circumferential frames;

a first floor structure having opposite lateral ends connected to the circumferential frames; and at least one strut for supporting the first floor structure, said strut having a lower end fixed to a circumferential frame of said plurality of circumferential frames and an opposite upper end fixed to the first floor structure.

According to the invention, the primary fuselage structure includes at least one failure-initiating element including a first fastening means or arrangement by which the failure-initiating element is fixed to a circumferential frame of said plurality of circumferential frames, at a distance from the lower end of the strut, as well as a second fastening means or arrangement by which the failure-initiating element is fixed on said strut, at a distance from the ends thereof, such that the failure-initiating element applies to said strut a spurious, that is to say lateral, force, under the influence of an impact force oriented substantially in the radial direction and inward relative to a longitudinal axis of the primary fuselage structure, so as to favor early failure in buckling of the strut subjected to a compression force resulting from said impact force.

Since the failure-initiating element is fixed to the strut at a distance from the ends thereof and on a circumferential frame, at a distance from the lower end of the strut, the failure-initiating element makes it possible to apply to the strut a lateral force under the influence of an impact force oriented substantially in the radial direction and inward relative to a longitudinal axis of the primary fuselage structure. Such a spurious force is oriented laterally, that is at a nonzero angle, and preferably more than 30 degrees, relative to a longitudinal direction of the strut, and thus makes it possible to favor early failure by buckling of the strut subjected to a compression force.

The early failure of the strut makes it possible to limit the level of force transmitted by it to the first aforementioned floor structure, and more generally to a portion of the primary structure positioned above this first floor structure, corresponding to the second portion of the primary structure defined above, that is the portion that is intended to crush in a second phase of the crushing scenario of the primary structure following a crash.

This makes it possible to reduce the structural resistance required as regards the second aforementioned portion of the primary structure, and therefore to reduce the mass of the last mentioned.

This also makes it possible to delay the crushing of this second portion of the primary structure, and therefore to maximize the absorption of energy brought about by the crushing of the first portion of the primary structure, defined below the aforementioned first floor structure.

Moreover, the failure-initiating element does not apply a spurious force to the strut in normal operation, so that it is not necessary to take that spurious force into account in dimensioning the strut.

The invention thus allows a mass saving relative to the known solution, described above, of document WO 2009/101372 A1, wherein the failure of the struts is obtained by cutting the strut under the influence of a longitudinal force applied thereto.

It should be noted that the longitudinal axis of the primary structure of the fuselage is defined here as being the longitudinal axis extending equidistant from the lower and upper ends of the primary fuselage structure, and equidistant from opposite lateral ends of that primary structure. In the particular case of a primary fuselage structure having axial symmetry, the longitudinal axis is simply the axis of symmetry of the primary structure.

Said strut and said failure-initiating element are advantageously, but not necessarily fixed on the same circumferential frame.

Moreover, said strut is preferably fixed on a beam of the aforementioned first floor structure.

That beam is preferably made of a metal, of aluminum for example.

In addition, said strut is preferably inclined relative to the vertical direction so that its second end is closer to a vertical plane passing through a longitudinal axis of the primary structure than is the lower end of the strut.

Generally, it should be noted that the aforementioned vertical plane generally constitutes a median plane of symmetry of the primary fuselage structure.

The strut is preferably made of a metal, such as a titanium alloy.

The associated failure-initiating element is advantageously made of a composite material, consisting for example of carbon fibers embedded in a hardened epoxy resin.

Said second fastening means of said failure-initiating element are preferably separated from each end of said strut by a distance greater than or equal to 25% of the total length of said strut.

This makes it possible to move the zone of application of the aforementioned spurious force away from the ends of the strut, so as to maximize the effect of this spurious force and to favor as much as possible the failure of the strut in buckling.

Furthermore, said failure-initiating element preferably includes a compression beam having two opposite ends, at which said first and second fastening means are respectively positioned.

Such a configuration of the failure-initiating element allows effective transmission of the aforementioned spurious force.

Moreover, said compression beam advantageously extends in a direction forming an angle comprised between 45 degrees and 145 degrees with the longitudinal direction of said strut.

This makes it possible to maximize the effect of the aforementioned spurious force on the strut.

Moreover, this makes it possible to minimize the compression force applied to the failure-initiating element during normal operation of the aircraft equipped with said primary fuselage structure, under the influence of the load on the first floor structure.

In addition, said strut and said compression beam constituting the failure-initiating element preferably extend perpendicularly to a longitudinal direction of said primary structure.

As a variant, one and/or the other of the strut and of the aforementioned compression beam can extend in a direction that is not perpendicular to the longitudinal direction of said primary structure, without departing from the scope of the invention.

Generally, said plurality of circumferential frames preferably includes at least one circumferential frame, hereafter called an energy-dissipating circumferential frame, comprising at least one angular sector made of a metallic material, extending circumferentially to either side of a virtual longitudinal line passing through the lower end of said strut.

The metallic nature of the aforementioned angular sector of this circumferential frame confers upon it the ability to deform plastically and hence to absorb a considerable portion of the impact energy resulting from a crash.

The metallic material constituting the aforementioned angular sector of the circumferential frame is preferably a titanium alloy.

Moreover, said angular sector made of metallic material advantageously extends to either side of the vertical plane passing through the longitudinal axis of the primary structure, preferably symmetrically with respect to said vertical plane.

This makes it possible to favor consistent energy absorption on either side of the aforementioned vertical plane, which is the plane in which the upward oriented impact force is exerted in the case of a standard crash scenario of the type describe above.

In one preferred embodiment of the invention, said primary floor structure is a lower floor structure, and said primary structure also includes:

a main floor structure positioned above said lower floor structure and having opposite lateral ends connected to said plurality of circumferential frames, and at least two struts having respective lower ends positioned on either side of said vertical plane and fixed on said angular sector made of metallic material of the aforementioned energy-dissipating circumferential frame, as well as respective opposite upper ends fixed on said main floor structure, so as to support the last mentioned.

The metal angular sector, the main floor structure and the two struts that support it thus constitute a closed load path which is entirely made of metal and therefore plastically deformable in its entirety.

This load path therefore does not have any weak area having a tendency to break prematurely, which makes it possible to maximize the ability of the primary fuselage structure to absorb the impact energy consecutive to a crash.

The main floor structure can for example constitute the structure of a passenger cabin floor.

The respective upper ends of the struts supporting said main floor structure are preferably fixed on a beam of that floor structure.

The respective lower ends of the struts supporting said main floor structure are preferably positioned laterally beyond said lower floor structure. These lower ends of the struts can thus be positioned respectively near the two opposite circumferential ends of the angular sector made of metallic material of the energy-dissipating circumferential frame.

The struts supporting said main floor structure preferably extend in the vertical direction, in a known manner.

Moreover, in the preferred embodiment of the invention, said energy-dissipating circumferential frame also includes at least one angular sector made of a composite material including reinforcing fibers embedded in a hardened resin matrix.

In the preferred embodiment of the invention, the energy-dissipating circumferential frame includes a single annular sector made of composite material, having two circumferential ends joined to two circumferential ends of the angular sector made of metallic material. These two angular sectors thus constitute the entirety of the energy-dissipating circumferential frame.

Generally, the energy-dissipating circumferential frame can advantageously include a plurality of angular sectors mounted end-to-end circumferentially, at least one whereof being made of metallic material and at least one other whereof being made of composite material.

As a variant, the energy-dissipating circumferential frame can be entirely made of metal, without departing from the scope of the present invention.

In the preferred embodiment of the invention, said plurality of circumferential frames also includes at least one circumferential frame entirely made of composite material, hereafter called a composite circumferential frame. It is to be understood that this designation includes any frame made of composite material not having an angular sector made of metallic material of the type described above.

The plurality of circumferential frames thus preferably consists of energy-dissipating circumferential frames and of composite circumferential frames which can be arranged according to different alternation schemes, including for example one circumferential frame in every two of the composite type, or one circumferential frame in three of the composite type, or having consecutive pairs of energy-dissipating circumferential frames alternating with consecutive pairs of composite circumferential frames.

Generally, the primary fuselage structure preferably includes a plurality of struts having a lower end fixed on a circumferential frame of said plurality of circumferential frames and an opposite upper end fixed on said first floor structure, so as to support the last mentioned.

These struts are preferably configured symmetrically with respect to the aforementioned vertical plane passing through the axis of the primary structure.

In particular, said plurality of struts preferably includes at least one pair of struts, hereafter called main struts, the respective lower ends whereof are fixed on one and the same circumferential frame and the respective upper ends whereof are fixed on said first floor structure, said main struts being arranged symmetrically on either side of the vertical plane passing through the longitudinal axis of the primary structure, said primary structure including at least two failure-initiating elements the first fastening means whereof are fixed on a portion of said circumferential frame extending between said lower ends of said main struts, and the second fastening means whereof are respectively fixed to said main struts, at a distance from the ends of said main struts.

The failure-initiating elements associated with the two main struts can thus each be fixed to a portion of the circumferential frame which is located near the aforementioned vertical plane.

This allows these failure-initiating elements to be fixed as close as possible to the part of the circumferential frame to which the impact force is applied in the case of the standard crash of the type described above.

To this end, the angular spacing between said vertical plane and said first fastening means of each of the two failure-initiating elements respectively fastened to said main struts, measured about the longitudinal axis of the primary structure, is preferably less than or equal to 10 degrees, and even more preferably less than or equal to 5 degrees.

In addition, the two failure-initiating elements fastened to the two main struts preferably extend symmetrically with respect to said vertical plane.

Moreover, in the preferred embodiment of the invention, said plurality of struts supporting said first floor structure also includes a pair of secondary struts positioned laterally on either side of the assembly consisting of said pair of main struts and fixed on the same circumferential frame as the last mentioned.

The invention also relates to a fuselage segment for aircraft including a primary fuselage structure of the type described above.

The invention also relates to an aircraft, such as an airliner of the medium- or high-capacity type, including at least one fuselage segment and/or a primary fuselage structure of the type described above.

BRIEF DESCRIPTION OF THE DRAWINGS

The invention will be better understood, and its other details, advantages and features will appear upon reading the following description, given by way of a non-limiting example and with reference to the appended drawings wherein.

In all of these figures, identical reference symbols can designate identical or similar elements.

DETAILED DESCRIPTION OF THE PREFERRED EMBODIMENTS

Figure 3:
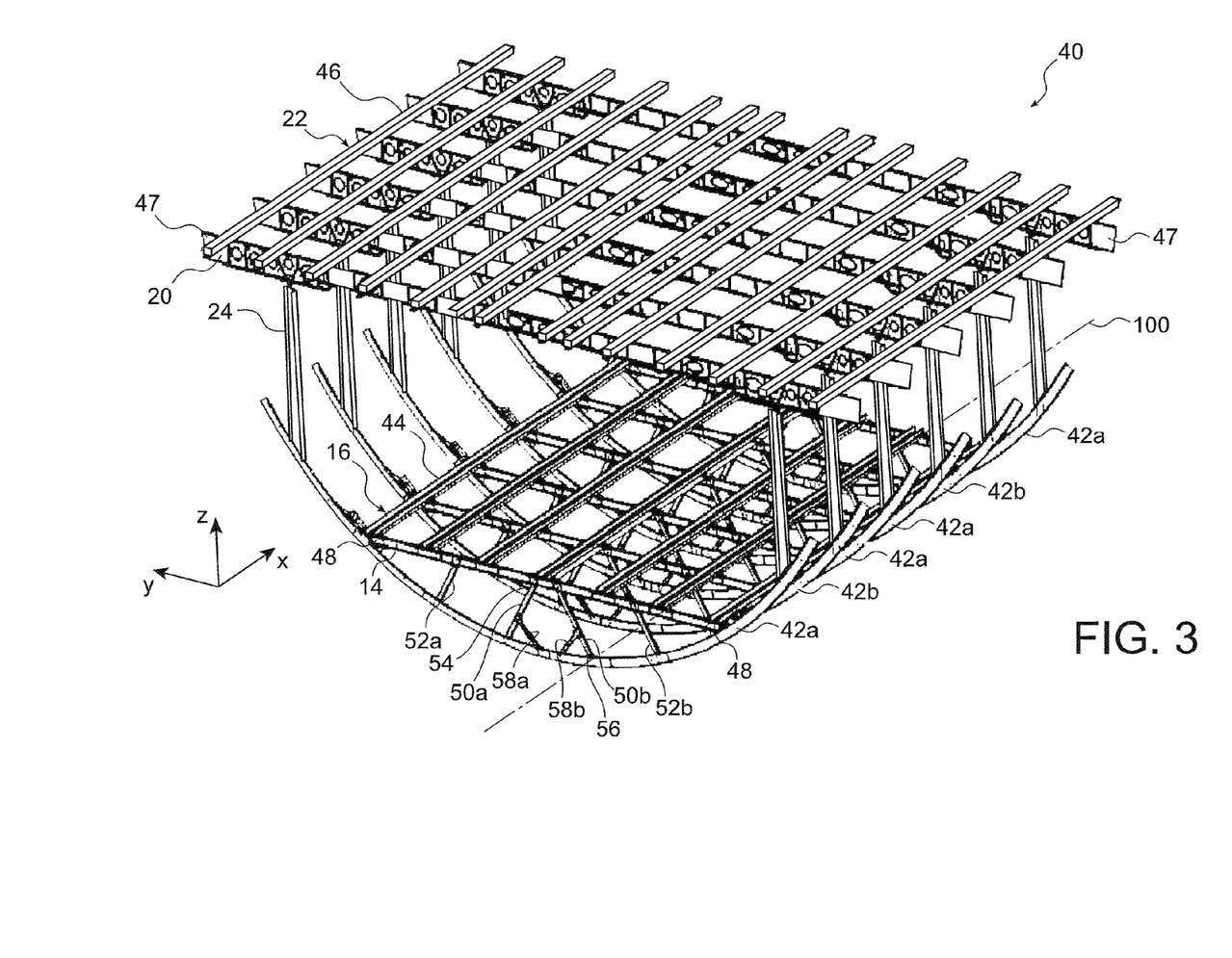
FIG. 3 is a partial schematic perspective view of a lower portion of a primary airplane fuselage structure according to a preferred embodiment of the invention.

FIG. 3 illustrates a lower portion of a primary fuselage structure 40 of an airplane according to a preferred embodiment of the invention.

Throughout the present description, X designates the longitudinal direction of the primary fuselage structure 40 which can also be assimilated to the longitudinal direction of the airplane comprising this primary fuselage structure. In addition, Y designates the direction that is oriented transversely to the primary fuselage structure 40 and can also be assimilated to the transverse direction of the airplane, and Z is the vertical or height direction, these three directions X, Y and Z being mutually orthogonal.

In the example described, the fuselage of the airplane consists of several segments. FIG. 3 thus illustrates a portion of the primary structure of a segment of that fuselage.

This primary structure 40 comprises a plurality of circumferential frames 42a, 42b, of which only a lower portion is shown in FIG. 3, as well as a lower floor structure 16 and a main floor structure 22.

In a manner known in se, the lower floor structure 16 includes a criss-cross of beams 14 and longitudinal rails 44 which are for example made of aluminum, and the main floor structure 22 includes a criss-cross of beams 20 and of longitudinal rails 46 which are also made of aluminum.

Each beam 20 of the main floor structure 22 is connected at its lateral ends 47 to a circumferential frame 42a, 42b and is supported by two struts 24 which are for example made of aluminum.

Each beam 14 of the lower floor structure 16 is connected at its lateral ends 48 to a circumferential frame 42a, 42b.

Figure 4:
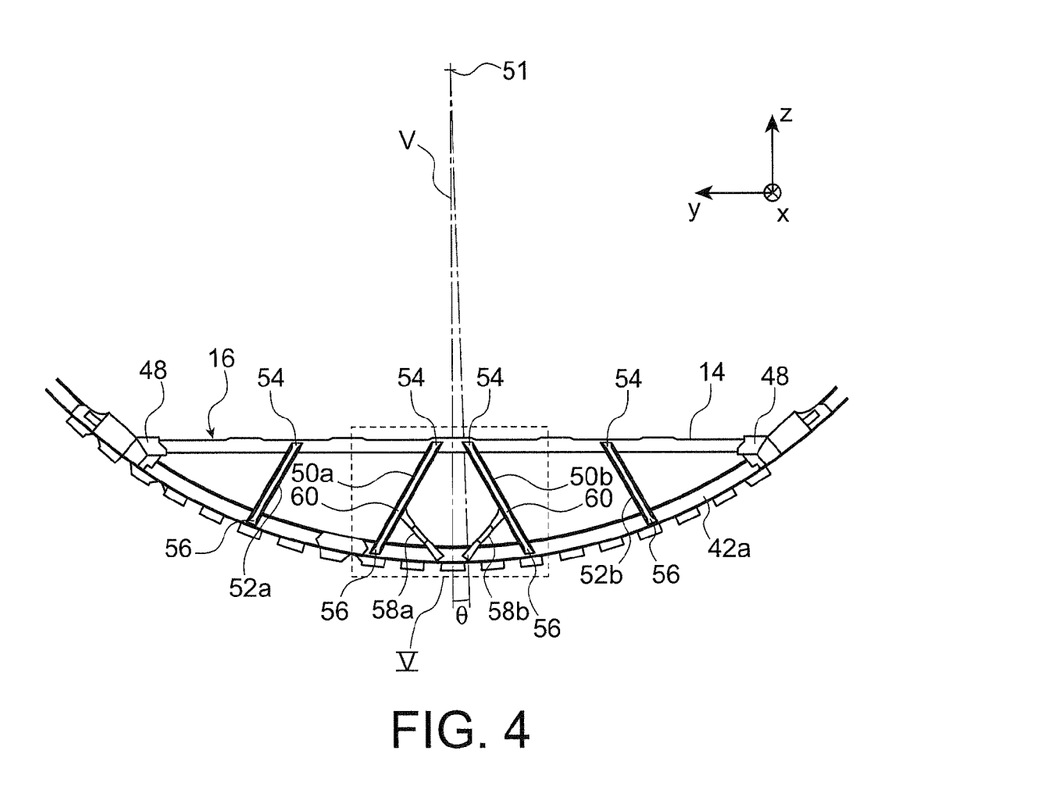
FIG. 4 is a partial schematic cross-section view of a lower portion of the primary fuselage structure of FIG. 3.

As shown more clearly by FIG. 4, each beam 14 of the lower floor structure 16 is also supported by four struts, sometimes called rods, connected to the same circumferential frame 42a as the lateral ends 48 of the beam 14. These struts are made of metal, of a titanium alloy for example.

These four struts are subdivided into one pair of main struts 50a and 50b positioned in relative proximity to the vertical plane V passing through the axis 51 of the primary fuselage structure 40, and mutually symmetrical with respect to this vertical plane V, as well as two secondary struts 52a and 52b positioned laterally on either side of the pair of main struts 50a, 50b, also symmetrically relative to the vertical plane V.

Each of these four struts includes an upper end 54 fixed on the aforementioned beam 14, and a lower end 56 fixed on the circumferential frame 42a.

In addition, each of these struts extends perpendicular to the longitudinal direction X and is inclined relative to the vertical plane V such that the upper end 54 of the strut is closer to this vertical plane V than its lower end 56.

Figure 5:
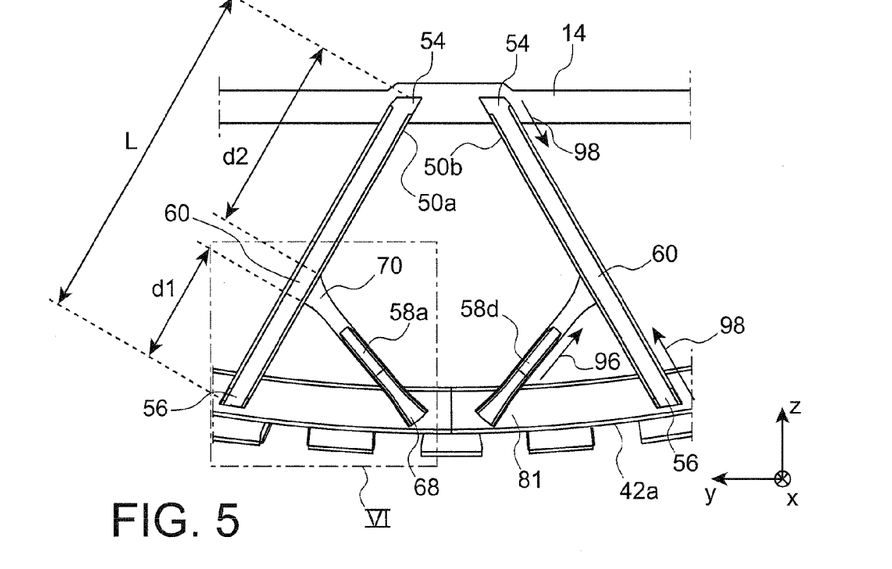
FIG. 5 is a larger-scale view of detail V of FIG. 4.

In a manner suited to the invention, each main strut 50a, 50b is connected to a corresponding failure-initiating element 58a, 58b, which consists essentially of a compression beam having a lower end 68 fixed on the same circumferential frame 42a as the main strut, and an upper end 70 fixed on the main strut, at a zone 60 of the strut away from its ends 54 and 56 (FIGS. 4 and 5). This compression beam is preferably made of composite material, for example based on carbon fibers embedded in a hardened epoxy resin.

Figure 6:
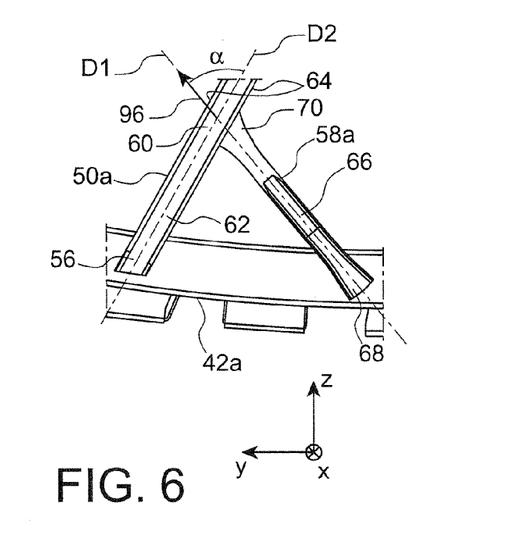
FIG. 6 is a larger-scale view of detail VI of FIG. 5.
Figure 7:
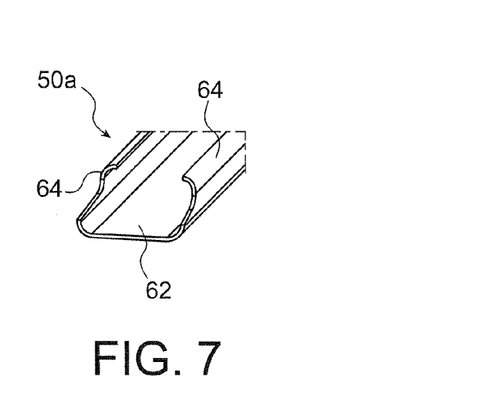
FIG. 7 is a schematic perspective view of a lower end of a strut belonging to the lower portion of the primary fuselage structure visible in FIG. 4.

As illustrated by FIGS. 6 and 7, each of the four struts 50a, 50b, 52a, 52b has the form of a compression beam having a flat core 62 connected to two rigidizing lateral flanges 64, so that the aforementioned beam has a substantially C-shaped cross-section. In the example described, the lateral edges 64 of the beam are tapered at the lower end 56 of the strut (FIG. 7).

Figure 8:
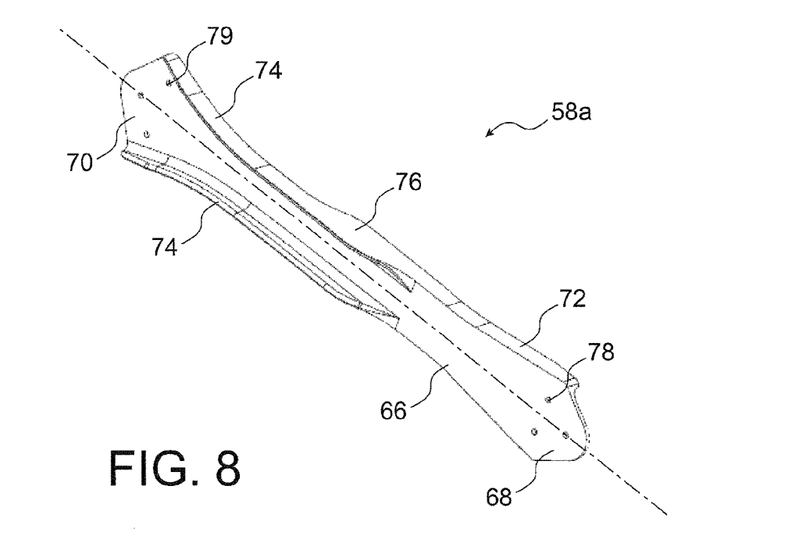
FIG. 8 is a schematic perspective view of a failure-initiating element belonging to the lower portion of the primary fuselage structure visible in FIG. 4.
Figure 9:
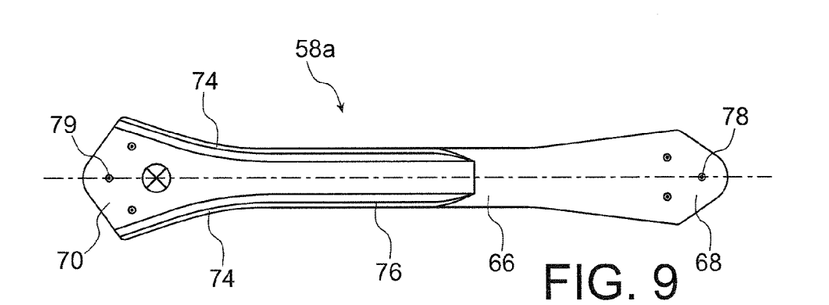
FIGS. 9 and 10 are schematic views, from below and in side elevation respectively, of the failure-initiating element of FIG. 8.
Figure 10:
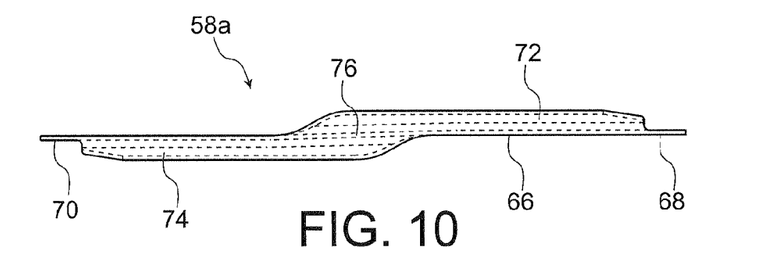

FIGS. 8 through 10 illustrate in more detail the compression beam constituting one of the failure-initiating elements 58a. This beam includes a flat core 66 having two opposite flared ends respectively constituting the lower end 68 and the upper end 70 of the failure-initiating element. These two ends 68 and 70 have respective rigidizing lateral edges 72 and 74 which project respectively on either side of the core 66, perpendicularly to it, and which connect to one another at a median zone 76 of the failure-initiating element 58a.

Each of the flared ends 68, 70 of the failure-initiating element 58a comprises through holes 78 and 79 (FIGS. 8 and 9), which are for example three in number, allowing passage to fastening screws or rivets (these screws or rivets not being shown in the figures). The aforementioned holes 78 and 79 thus constitute part of the first fastening arrangement and of the second fastening arrangement, respectively, of the failure-initiating element 58a, according to the terminology of the present invention.

In the example illustrated, the failure-initiating element 58a is applied to the corresponding strut 50a by a first face of the core 66 of that failure-initiating element 58a, opposite the corresponding lateral edges 74, and this failure-initiating element 58a is applied on the corresponding circumferential frame 42a by a second face, opposite the corresponding lateral edges 72 and to the aforementioned first face.

As illustrated by FIG. 5, the failure-initiating elements 58a, 58b respectively fastened to the two main struts 50a, 50b, extend between them. More precisely, the lower end 68 of each of these failure-initiating elements is fixed on a portion 81 of the circumferential frame 42a which extends between the respective lower ends 56 of the two main struts 50a, 50b.

Still referring to FIG. 5, it is apparent that the zone 60 of each strut 50a, 50b, to which is connected the upper end 70 of the associated failure-initiating element 58a, 58b, is separated from the lower end 56 of the strut 50a, 50b by a distance d1 roughly equal to 35% of the length L of the strut, and is separated from the upper end 54 of this strut by a distance d2 roughly equal to 55% of the length L of the strut. More generally, the distances d1 and d2 are preferably greater than 25% of the length L of the strut 50a, 50b, as explained above.

Figure 12:
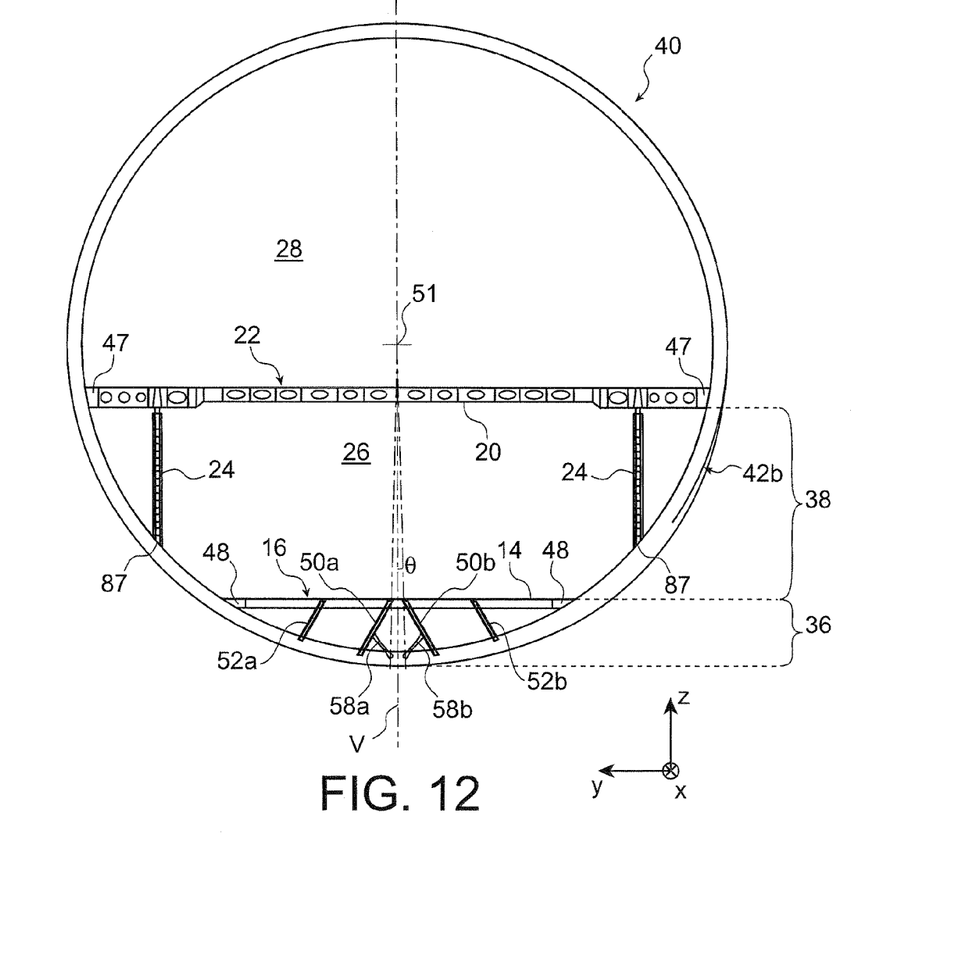
FIG. 12 is a schematic cross-section view of the primary fuselage structure of FIG. 3, illustrating a circumferential frame made entirely of composite material.

The lower end 68 of each failure-initiating element 58a, 58b, for its part, is positioned close to the vertical plane V so that the holes 78 constituting the aforementioned first fastening means are comprised within an angle θ, measured relative to the vertical plane V from the longitudinal axis 51 of the primary structure 40, which is equal to about 5 degrees (FIGS. 4 and 12).

Moreover, as shown in FIG. 6, the compression beam constituting the failure-initiating element 58a extends in a direction D1 forming, with a longitudinal direction D2 of the corresponding strut 50a, an angle equal to about 60 degrees. The same is of course true as regards the other main strut 50b and its associated failure-initiating element 58b. More generally, the angle α can advantageously be comprised within the range extending from 45 degrees to 135 degrees.

As illustrated by FIG. 3, the primary fuselage structure 40 comprises circumferential frames 42a of a first type and circumferential frames 42b of a second type.

Figure 11:
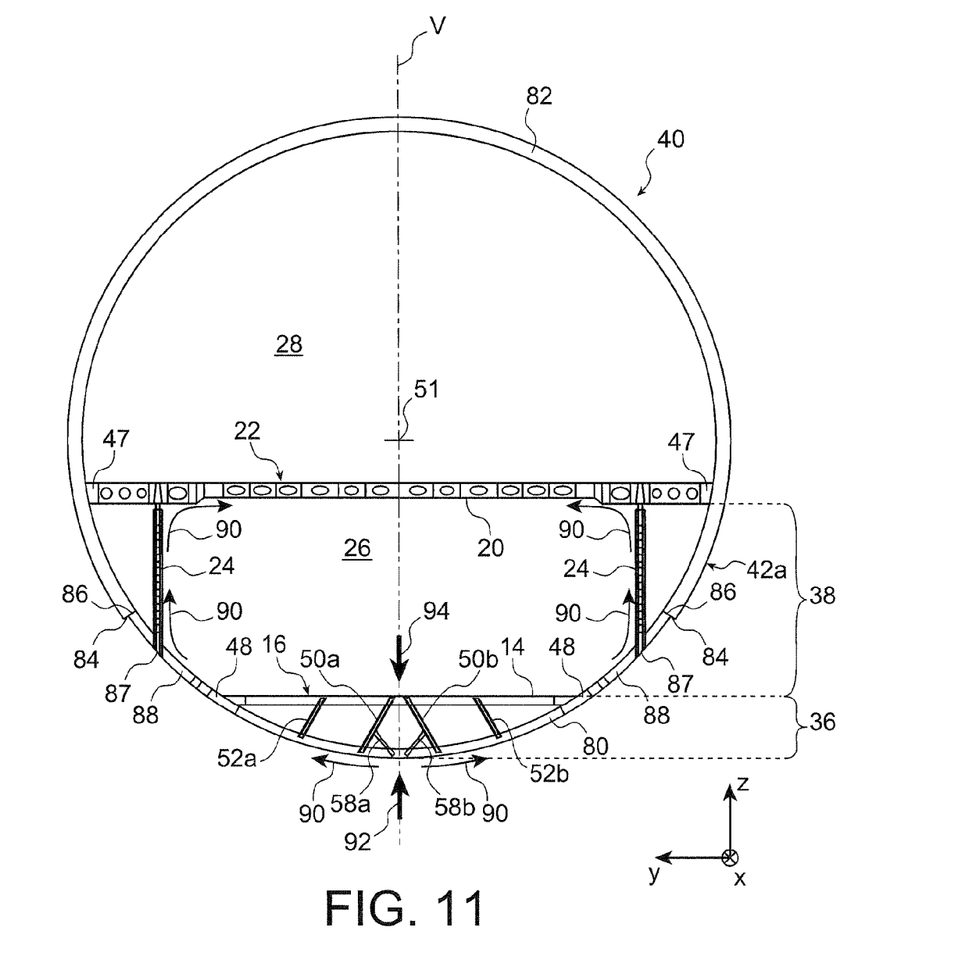
FIG. 11 is a schematic cross-section view of the primary fuselage structure of FIG. 3, illustrating a circumferential frame including a lower portion made of metallic material and an upper portion made of composite material.

FIG. 11 illustrates a circumferential frame 42a of the first type, which is characterized by the fact that it includes an angular section 80 made of metal, for example of titanium alloy, and an angular sector 82 made of a composite material, for example based on carbon fibers embedded in a hardened resin.

The angular sector 80 made of metal constitutes a lower portion of the circumferential frame 42a, and is centered relative to the vertical plane V passing through the axis 51 of the primary structure 40. The composite angular sector 82 is positioned above the angular sector 80 made of metal and has circumferential ends 84 joined to the circumferential ends 86 of the angular sector 80 made of metal.

Thus, the four struts 50a, 50b, 52a, 52b which support each beam 14 of the lower floor structure 16 are fixed on the angular sector 80 made of metal of the corresponding circumferential frame 42a.

It should be noted that the angular sector 80 made of metal extends circumferentially beyond the lateral ends 48 of the beams 14 of the lower floor structure 16.

In addition, the two struts 24 that support each beam 20 of the main floor structure 22 are also fixed on the angular segment 80 made of metal of the corresponding circumferential frame 42a. More precisely, these two struts 24 have lower ends 87 fixed on portions 88 of the angular sector 80 which each extend laterally between a lateral end 48 of the corresponding beam 14 of the lower floor structure 16 and the corresponding end 86 of this angular sector 80.

The angular sector 80 made of metal of each energy-absorbing circumferential frame 42a thus constitutes, with the corresponding beam 20 of the main floor structure 22 and with the struts 24 supporting it, a closed circulation path for the forces 90 induced by an upward-oriented impact 92 applied under the primary structure 40 vertically below its axis 51. Such an impact 92 corresponds to a standard crash case such as those considered by certification authorities. One advantage of the invention results from the fact that the elements constituting the aforementioned load path are all able to deform plastically and hence to absorb a large portion of the impact energy resulting from such a crash. The aforementioned load path thus does not have any weak areas tending to break prematurely in the event of a crash.

FIG. 12 illustrates a circumferential frame 42b of the second type, which is characterized by the fact that it is entirely made of a composite material, for example based on carbon fibers embedded in a hardened resin.

As illustrated by FIG. 3, the primary structure 40 has an alternating arrangement of two circumferential frames 42a of the first type and one circumferential frame 42b of the second type. ⅔ of the primary structure 40 thus consists of circumferential frames 42a of the first type, and ⅓ of circumferential frames 42b of the second type.

In normal operation, the lower floor structure 16 is generally subjected to a normal load 94 (FIG. 11) induced by the load carried by the lower floor. This downward oriented normal load 94 is taken by the main struts 50a, 50b and secondary struts 52a, 52b and transmitted to the circumferential frames 42a, 42b. Considering the relative angle α (FIG. 6) of inclination of the failure-initiating elements 58a, 58b relative to the main struts 50a, 50b, the normal force 94 imposes little load on the failure-initiating elements 58a and 58b.

In the event of a crash of the type described above, the lower ends 68 (FIG. 5) of the failure-initiating elements 58a and 58b are directly subjected to upward-oriented impact forces 90, such that these failure-initiating elements each transmit to the corresponding main strut 50a, 50b a spurious force 96 (FIGS. 5 and 6) oriented in the direction D1 of the compression beam constituting each failure-initiating element.

The application of such a spurious force 96, combined with the compression force 98 applied to the ends 54 and 56 of each main strut 50a, 50b and resulting from the impact 92, contributes to early buckling failure of each main strut 50a, 50b.

The early failure of the main struts 50a, 50b makes it possible to limit the level of the forces transmitted to the lower floor structure 16, and more generally to the second portion 38 of the primary structure 40. This makes it possible to reduce the structural strength required as regards the elements constituting this second portion 38, and that also makes it possible to delay the crushing of this second portion 38 and hence to maximize the energy absorption brought about by the crushing of the first portion 36 of the primary structure 40.

It should be noted that the plastic deformation of the main struts 50a, 50b and secondary struts 52a, 52b contribute to this energy absorption.

Furthermore, the progressive plastic deformation of the angular sector 80 made of metal of each circumferential frame 42a of the first type brings about progressive failure of the circumferential frames 42b, made of composite material. Such a progressive failure allows for energy absorption by these circumferential frames 42b of the second type much more effectively than the explosive failure observed as regards circumferential frames made of composite material in primary fuselage structures of known type.

Of course, the use of circumferential frames of the second type, that is made entirely of composite material, alternating with circumferential frames of the first type, allows a considerable mass saving.

The mixed structure of circumferential frames of the first type also allows a mass saving relative to circumferential frames made entirely of metal which equip primary fuselage structures of known type.

As a variant, the secondary struts 52a and 52b can also be connected to failure-initiating elements of the type described above.

Moreover, FIG. 3 shows that each circumferential frame is connected to struts 50a, 50b, 52a, 52b supporting the lower floor structure 16. It is possible, however, without departing from the scope of the invention, for only some of the circumferential frames to be connected to such struts. These circumferential frames are then preferably, but not necessarily, of the energy-dissipating type. In any case, the angular sector 80 made of metal of each energy-dissipating circumferential frame is preferably positioned so that at least one virtual longitudinal line 100 (FIG. 3) passes through it, running through the lower end 56 of at least one of the aforementioned struts.

Also as a variant, some or all of the energy-dissipating circumferential frames can be entirely made of metal when that is advantageous.

Moreover, the failure-initiating elements can be made in several parts. In particular, these elements can consist of a compression beam and one or two parts designed for assembling said compression beam onto the corresponding strut and/or onto the corresponding circumferential frame.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A primary fuselage structure for an aircraft, including:
a plurality of circumferential frames;
a first floor structure having opposite lateral ends connected to said circumferential frames; and
at least one strut for supporting said first floor structure, said strut including a lower end fixed on a circumferential frame of said plurality of circumferential frames and an opposite upper end fixed on said first floor structure,
said primary fuselage structure including at least one failure-initiating element including:
a first fastening arrangement by which the failure-initiating element is fixed on a circumferential frame of said plurality of circumferential frames, away from the lower end of said strut, as well as
a second fastening arrangement by which the failure-initiating element is fixed on said strut, away from the ends of said strut,
wherein the failure-initiating element applies to said strut a lateral force under the influence of an impact force oriented substantially in the radial direction and inward relative to a longitudinal axis of the primary fuselage structure, so as to contribute to early failure in buckling of the strut subjected to a compression resulting from said impact force.

2. The primary fuselage structure according to claim 1, wherein said second fastening arrangement of said failure-initiating element are separated from each end of said strut by a distance greater than or equal to 25% of a total length of said strut.

3. The primary fuselage structure according to claim 1, wherein said failure-initiating element includes a compression beam having two opposite ends at which are respectively positioned said first and second fastening arrangements.

4. The primary fuselage structure according to claim 3, wherein said compression beam of said failure-initiating element extends in a direction forming an angle comprised between 45 degrees and 145 degrees with a longitudinal direction of said strut.

5. The primary fuselage structure according to claim 3, wherein said strut and said compression beam of said failure-initiating element extend perpendicularly to a longitudinal direction of said primary structure.

6. The primary fuselage structure according to claim 1, wherein said plurality of circumferential frames includes at least one energy-dissipating circumferential frame comprising at least one angular sector made of a metallic material, and extending circumferentially to either side of a virtual longitudinal line passing through said lower end of said strut.

7. The primary fuselage structure according to claim 6, wherein said angular sector made of a metallic material extends to either side of a vertical plane passing through a longitudinal axis of the primary structure.

8. The primary fuselage structure according to claim 7, wherein said primary floor structure is a lower floor structure, said primary structure also including:
a main floor structure located above said lower floor structure and having opposite lateral ends connected to said plurality of circumferential frames, and
at least two struts having respective lower ends positioned on either side of said vertical plane and fixed on said angular sector made of metallic material of said energy-dissipating circumferential frame, as well as respective opposite upper ends fixed on said main floor structure, so as to support said main floor structure.

9. The primary fuselage structure according to claim 6, wherein said energy-dissipating circumferential frame also comprises at least one angular sector made of a composite material comprising reinforcing fibers embedded in a matrix of hardened resin.

10. The primary fuselage structure according to claim 6, wherein said plurality of circumferential frames also includes at least one circumferential frame made entirely of composite material.

11. The primary fuselage structure according to claim 1, including a plurality of struts having a lower end fixed on a circumferential frame of said plurality of circumferential frames, as well as an opposite upper end fixed on said primary floor structure so as to support said primary floor structure, and wherein said plurality of struts includes at least one pair of main struts the respective lower ends whereof are fixed on one and the same circumferential frame and the respective upper ends whereof are fixed on said first floor structure, said main struts being positioned symmetrically on either side of a vertical plane running through a longitudinal axis of the primary structure, said primary structure including at least two failure-initiating elements, the first fastening arrangement whereof being fixed on a portion of said circumferential frame extending between said lower ends of said main struts, and the second fastening arrangement whereof being respectively fixed to said main struts, away from their ends.

12. The primary fuselage structure according to claim 11, wherein the angular separation between said vertical plane and said first fastening arrangements of each of the two failure-initiating elements respectively associated with said main struts, measured from said longitudinal axis of said primary structure, is less than 10 degrees.

13. The primary fuselage structure according to claim 11, wherein said plurality of struts supporting said first floor structure also includes a pair of secondary struts positioned laterally on either side of the assembly constituted by said pair of main struts and fixed on the same circumferential frame as said main struts.

14. A fuselage segment for an aircraft, including a primary fuselage structure according to claim 1.

15. An aircraft, comprising at least one fuselage segment according to claim 14.

16. An aircraft, comprising at least one primary fuselage structure according to claim 1.

* * * * *